United States Patent
Amos

(10) Patent No.: US 6,837,506 B2
(45) Date of Patent: Jan. 4, 2005

(54) BICYCLE FRAME

(76) Inventor: Jeffrey Ernest Amos, Slacks Creek (AU)

( * ) Notice: Subject to any disclaimer, the term of this patent is extended or adjusted under 35 U.S.C. 154(b) by 0 days.

(21) Appl. No.: 10/344,771

(22) PCT Filed: Aug. 24, 2001

(86) PCT No.: PCT/GB01/03841

§ 371 (c)(1),
(2), (4) Date: Apr. 8, 2003

(87) PCT Pub. No.: WO02/16193

PCT Pub. Date: Feb. 28, 2002

(65) Prior Publication Data

US 2003/0151226 A1 Aug. 14, 2003

(30) Foreign Application Priority Data

Aug. 25, 2000 (GB) .............................................. 0020869

(51) Int. Cl.$^7$ .............................................. B62K 25/04
(52) U.S. Cl. ...................................... 280/275; 280/283
(58) Field of Search ................................ 280/274–277, 280/281.1, 283, 288.4

(56) References Cited

U.S. PATENT DOCUMENTS

| 4,118,045 A | 10/1978 | Kanazawa | .................. 280/283 |
|---|---|---|---|
| 4,621,827 A | * 11/1986 | Klein | ....................... 280/288.3 |
| 5,320,375 A | * 6/1994 | Reeves et al. | ............... 280/284 |
| 5,553,880 A | 9/1996 | McJunkin et al. | ........... 280/283 |
| 6,139,038 A | * 10/2000 | Santa Cruz et al. | ......... 280/278 |
| 6,398,247 B1 | * 6/2002 | Kuo | ....................... 280/288.4 |

FOREIGN PATENT DOCUMENTS

| FR | 2 776 979 | 10/1999 |
|---|---|---|
| GB | 1 557 262 | 12/1979 |
| GB | 2 284 395 | 6/1995 |
| GB | 2 329 164 | 3/1999 |

* cited by examiner

Primary Examiner—Lesley D. Morris
Assistant Examiner—L. Lum
(74) Attorney, Agent, or Firm—Nields & Lemack

(57) ABSTRACT

A bicycle frame includes a first rigid member with means for mounting a rear wheel and a front wheel assembly thereto. A second rigid member having means for mounting a seat post and pedals thereto is also provided. The second member is not connected directly to the first member but rather is linked by pivotable linkage to the first member. A shock absorber is preferably pivotably located between mounting points on the first and second rigid members. In a preferred embodiment a number of shock absorber mounting points are provided on the first member and first link in order to obtain an optimal shock absorber mounting position.

26 Claims, 1 Drawing Sheet

BICYCLE FRAME

BACKGROUND OF THE INVENTION

The present invention relates to a bicycle frame and a bicycle including the bicycle frame. More particularly, but not exclusively, it relates to a frame for a bicycle with an improved suspension system.

The invention is applicable to mountain bicycles; cross country bicycles; racing or touring bicycles. It is however, particularly relevant to mountain bikes and will be described herein in that context.

Mountain bicycles were developed for riding across rough and steep terrain. The original designs featured rigid frames having configurations similar to those of conventional touring bicycles. The only means available to insulate the bicycle's rider and structure from shocks when crossing rough terrain was the use of large pneumatic tyres. This could lead to rapid rider fatigue, and required robust construction or expensive materials of construction to reduce the risk of damage to the bicycle.

It is known to provide shock absorbers, incorporated into the front forks of a bicycle, to act as a suspension for the front wheel. This is of some benefit, but since the majority of the rider's weight is usually supported by the rear wheel, front wheel suspension is at best only a partial solution.

Hence, there have been attempts to provide so-called "full-suspension" frames, of which there are several variations.

As a general principle, they comprise a secondary frame on which the rear wheel is mounted, and which is pivoted to the main frame of the bicycle at or near the "bottom bracket", the point at which the pedals are mounted to the frame. This secondary frame, or "swingarm", is also connected to the main frame via a shock absorber. Impacts on the rear wheel from rough terrain cause the rear wheel and swingarm to pivot as a unit, the shock absorber damping out the worst of the impacts.

However, this general arrangement does have significant shortcomings. The sensitivity and effectiveness of the system can be critically dependent on the exact configuration of the pivot point relative to the bottom bracket. Sideways forces exerted on the rear wheel or on the frame can be transmitted through the shock absorber without being damped, and can tend to twist components out of alignment and may tend to loosen or damage vital joints, especially the pivot point between the swing arm and the mainframe. The swingarm and rear wheel are constrained to move in an arc of a circle, which may not be an optimum response to an impact or shock. Furthermore, a full-suspension frame is significantly heavier and more complicated to construct and maintain than a conventional frame.

In a "linkage" type of full-suspension frame, the swingarm is not a single unit but comprises three linkages, each one pivoted to the next in series, and pivoted at each end to the main frame of the bicycle. One of these linkages is also connected to the main frame via a shock absorber. This allows a more linear motion of the rear wheel under impact, since it is mounted to the linkage not pivoted directly to the main frame. However, it can be even heavier than the normal full-suspension frame, it is more complex to build and maintain, and the number of individual pivots and linkages greatly increase the chances of misalignment and bearing failure.

In the "URT" (unified rear triangle) variant of a full-suspension frame, a triangular swingarm, bearing both the rear wheel mounting and the bottom bracket, pivots on the main frame and is also connected to the main frame via a shock absorber, but the distance between the rider's seat and the pedals can change during the action of the suspension. The weight distribution can be unpredictable, especially should the rider change from sitting on the saddle to standing up on the pedals. In this latter case, he is no longer insulated from impacts on the rear wheel.

The "flex" system relies on the "chain stay", the section of a conventionally configured frame which connects the bottom bracket to the point at which the rear wheel is attached comprising an inherently flexible material. A shock absorbing element is present in the seat stays, the section of a conventionally configured frame which connects the point at which the rear wheel is attached to the top of the frame, adjacent the point of attachment of the rider's seat. Such a frame is relatively lightweight and simple, but it does not provide as much damping as the other forms of suspension, and it tends to be flexible laterally as well as vertically, leading to severe misalignment problems.

SUMMARY OF THE INVENTION

The present invention seeks to provide a frame obviating at least some of the above disadvantages and providing a suspension system for bicycles which insulates the rider from shocks and impacts, thereby increasing comfort and reducing fatigue. The present invention further seeks to provide a bicycle comprising such a frame and suspension system.

According to a first aspect of the present invention, there is provided a bicycle frame comprising a first rigid member comprising means to mount a rear wheel, and means to mount a front wheel assembly, a second rigid member not connected directly to said first member and comprising means to mount a seat for a rider, and means to mount pedals, linkage means connecting pivotably between said first and said second rigid members, and shock absorbing means mounted between the linkage means and the first rigid member. A frame according to the present invention thus provides a suspension capable of absorbing large impacts whilst allowing a lightweight design. It is an important aspect of the invention that the first and second rigid members are not directly connected so that the components attached to one rigid member are made somewhat independent of movement occurring to components attached to the other rigid member. The positioning of the shock absorbing means allows for any type of gears as the suspension does not impinge on the drive/chain area. The distance between the seat and pedal axis remains fixed regardless of suspension movement. The design also helps to resist frame twisting which helps keep front and rear wheels in substantial alignment on rough terrain. The present invention allows the use of modern materials and manufacturing methods and also allows for aesthetically pleasing designs which are, of course, important in all areas of vehicle design. The linkage means may comprise a first trailing link connecting between an upper part of the second rigid member and a forward part of the first rigid member. The linkage means may further comprise a second leading link connecting between a lower part of the second rigid member and a rearward part of the first rigid member. The second leading link may be connected to the first rigid member via a bottom mount point. The bottom mount point may be one of a series of adjusting holes in order to allow angle adjustment of lower leading link to control frame response in heavy load situations. The force on the pedals is changed from rotating to linear by the action of the chain and so changing the angle of the lower leading links in relation to the top of the chain allows the pedal force to be used to partially suspend the rider and improve rear wheel traction by helping to hold the rear wheel in contact with the ground.

Preferably, the shock absorbing means is mounted to the first training link at a point intermediate between the ends thereof. A shock absorber is attached at its top end to the upper trailing link via a pivot bearing in one of a plurality of pivot points, and at a bottom end to each main frame element at one of a plurality of pivot points. The upper and lower points of attachment of the shock absorber may be moved to any one of the pivot points to tune the response of the frame to shocks and impacts. In this way the adjustment of the suspension may be highly variably without changing the basic components, such as the shock absorbing means.

Alternatively, the first trailing link may be provided with an extension piece, extending beyond the point at which it is mounted to the second rigid member and the shock absorbing means may be mounted to the extension piece.

In either case, the shock absorbing means may be mounted to the first rigid member, preferably at a point below the point at which the shock absorbing means is mounted to the first trailing link or the extension piece.

The shock absorbing means may comprise an air/oil or pneumatic shock absorber. Alternatively the shock absorbing means could be a coil spring shock absorber or an elastomeric material, such a polyurethane elastomer or microcellular polymer.

The first rigid member may comprise a pair of frame elements spaced apart by a plurality of spacer elements. The shock absorbing means may be so mounted to the frame elements as to be disposed in a gap therebetween. This arrangement protects the shock absorbing means and also provides lateral support to the top link which in turn provides lateral support to the second rigid member.

The second rigid member may pass between the frame elements without being connected directly thereto. This allows a simple design which maintains the independence of the two rigid members.

The means to mount a rear wheel may comprise a rear dropout system.

Preferably, the first rigid member and/or the second rigid member, or sections thereof, comprise any one of: aluminium, magnesium, titanium, alloys of the aforesaid materials, a fibre reinforced composite material, or mixtures thereof.

According to second aspect of the present invention there is provided a bicycle comprising a bicycle frame as claimed in any one of the preceding claims.

Preferably the bicycle is such that the means to mount pedals comprises a bottom bracket of the second rigid member.

Typically the bicycle further comprises a rear wheel, a pedal-driven propulsion means mounted to the bottom bracket of the second rigid member and linked to said rear wheel, a front frame mounted rotatably to a head set tube portion of the first member, a steering means mounted to the front frame and a front wheel mounted to the front frame.

The first rigid member may also include fittings so that loads, e.g. camping gear, panniers, may be carried without affecting the comfort of the rider.

The front frame may include further shock-absorbing means.

BRIEF DESCRIPTION OF THE DRAWING

An embodiment of the present invention will now be more particularly described by way of example and with reference to the accompanying drawing, in which.

DETAILED DESCRIPTION OF THE INVENTION

Figure 1:
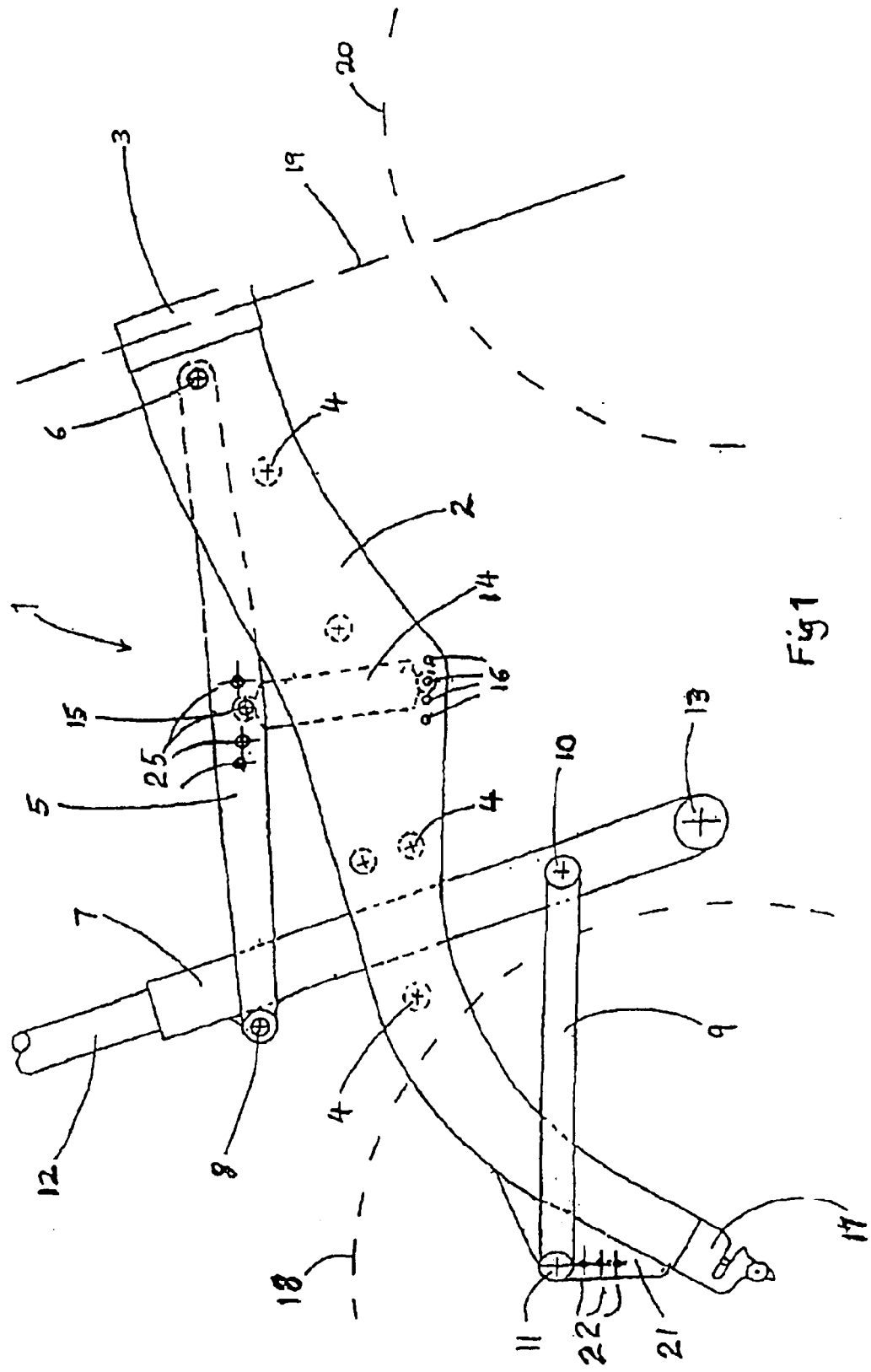
FIG. 1 is a side view of a frame embodying the invention.

Referring now to the drawing, a frame 1 for a bicycle comprises a pair of main frame elements 2 (left and right hand pair; left hand element hidden in the view), which are connected and maintained at the required separation by a head set tube 3 and a plurality of spacers 4. The frame 1 comprises a first rigid member 1.

Each main frame element 2 bears at a lower end remote from the head set tube 3, a rear dropout system 17, to which a rear wheel indicated at 18, may be fitted. A set of gears (not shown) may also be fitted to the main frame element 2 adjacent the rear dropout system 17. The rear dropout system 17 may be exchangeable for a rear dropout system adapted to receive a disk-brake unit for the rear wheel 18. Alternatively or additionally, said lower end may also be adapted for carrying loads, such as panniers or camping gear.

A bicycle or mountain bike using the basic frame elements 2 has the rear wheel 18 fitted to the rear dropout system 17, and a front frame (not shown) including a front wheel (also not shown) fitted into the head set tube 3. The frame 2 and the front and rear wheel therefore form a single unit. The front frame comprises handlebars and a front fork unit (not shown), with a front wheel 20 fitted between attachment points, each at an end of an arm of the fork, the unit being rotatable about axis 19.

The front frame may comprise independent suspension means, such as a shock absorber, incorporated into each arm of the front fork unit.

A seat tube 7 comprises a second rigid member 7 and has at its upper end a seat post 12, which bears a saddle (not shown) for a rider, and at its lower end a bottom bracket 13, to which may be mounted pedals and a chain set (not shown). The seat tube 7 is not connected directly to the frame elements 2.

An upper trailing link 5 is attached at one end to each main frame element 2 via a pivot bearing 6, and at its other end to the seat tube 7 via a pivot bearing 8 located adjacent an upper end of the seat tube 7. The pivot bearing 8 is advantageously located rearward to seat tube 7.

The seat tube 7 is also connected to the main frame elements 2 by means of a pair of lower leading links 9 (left and right hand pair; left hand link hidden in this view), which are attached to the seat tube 7 via a pair of pivot bearings 10 located adjacent a lower end of the seat tube 7 and to each main frame element 2 via a pair of pivot bearings 11 located on a lug 21 of each frame element 2 remote from the head set tube 3. The pivot bearings 11 are fixed to the lug 21 via a mounting point 22. The mounting point 22 is one of a series of mounting points 22 provided on each lug 21 so that the angle of the second leading links, which are also lower leading links, 9 can be adjusted.

A shock absorber 14 is attached at its top end to the upper trailing link 5 via a pivot bearing 15 in one of a plurality of pivot points 25, and at a bottom end to each main frame element 2 at one of a plurality of pivot points 16. The upper and lower points of attachment of the shock absorber 14 may be moved to any one of the pivot points 16/25 to tune the response of the frame 1 to expected shocks and impacts.

As may be seen, the seat tube 7 carrying the saddle and the bottom bracket for the pedals is isolated from the frame elements 2 which join rigidly the front and rear wheels (or rigid points within independently flexible wheel carrying structures). Hence, whether the rider is seated in the saddle or standing on the pedals, he or she is isolated from shocks transmitted from the ground to the frame 2 via either front or rear wheels. The entire seat tube 7 may move with respect to the main frame elements 2, being held in a position determined by links 5 and 9, and by the shock absorber 14.

What is claimed is:

1. A bicycle frame comprising:
   a first rigid member comprising,
      means to mount a rear wheel, and
      means to mount a front wheel assembly;
   a second rigid member not connected directly to said first member and comprising,
      means to mount a seat for a rider, and
      means to mount pedals;
   linkage means connecting pivotably between said first and said second rigid members; and
   shock absorbing means mounted between the linkage means and the first rigid member, wherein the linkage means comprises a first trailing link connecting between an upper part of the second rigid member and a forward part of the first rigid member.

2. A bicycle frame as claimed in claim 1, wherein the shock absorbing means is mounted to the first trailing link at a point intermediate between the ends thereof.

3. A bicycle frame as claimed in claim 1, wherein the first trailing link is provided with an extension piece, extending beyond the point at which it is mounted to the second rigid member.

4. A bicycle frame as claimed in claim 3, wherein the shock absorbing means is mounted to the extension piece.

5. A bicycle frame as claimed in claim 1, wherein the linkage means further comprises a second leading link connecting between a lower part of the second rigid member and a rearward part of the first rigid member.

6. A bicycle frame as claimed in claim 5, wherein the rearward part of the first rigid member includes a member having attachment holes and the second leading link is fixed to the first rigid member via a selected one of said attachment holes.

7. A bicycle frame as claimed in claim 1, wherein the linkage means further comprises a second leading link connecting between a lower part of the second rigid member and a rearward part of the first rigid member.

8. A bicycle frame as claimed in claim 7, wherein the rearward part of the first rigid member includes a member having attachment holes and the second leading link is fixed to the first rigid member via a selected one of said attachment holes.

9. A bicycle frame as claimed in claim 1, wherein the shock absorbing means is mounted to the first rigid member.

10. A bicycle frame as claimed in claim 1, wherein the shock absorbing means is mounted to the first rigid member at a point below the point at which the shock absorbing means is mounted to the linkage means.

11. A bicycle frame as claimed in claim 1, wherein the first rigid member is provided with a plurality of alternative attachment points for mounting the shock absorbing means thereto whereby the shock absorbing means is interchangeably mountable to any one of said attachment points.

12. A bicycle frame as claimed in claim 1, wherein the linkage means is provided with a plurality of alternative attachment points for mounting the shock absorbing means thereto whereby the shock absorbing means is interchangeably mountable to any one of said attachment points.

13. A bicycle frame as claimed in claim 1, wherein the shock absorbing means comprises an air/oil or pneumatic shock absorber.

14. A bicycle frame as claimed in claim 1, wherein the shock absorbing means comprises a coil spring shock absorber.

15. A bicycle frame as claimed in claim 1, wherein the shock absorbing means comprises an elastomeric material.

16. A bicycle frame as claimed in claim 15, wherein the first rigid member comprises a pair of frame elements spaced apart by a plurality of spacer elements.

17. A bicycle frame as claimed in claim 16, wherein the second rigid member passes between the frame elements without being connected directly thereto.

18. A bicycle as claimed in claim 1, wherein the means to mount a rear wheel comprises a rear dropout system.

19. A bicycle frame as claimed in claim 1, wherein the first rigid member or the second rigid member, or both the first rigid member and the second rigid member comprise any one of aluminium; magnesium; titanium; alloys of the aforesaid metals; a fibre reinforced composite material; or a mixture thereof.

20. A bicycle frame as claimed in claim 1, wherein the first rigid member further includes attachment means for attaching a load to the bicycle frame.

21. A bicycle including a bicycle frame as claimed in claim 1.

22. A bicycle as claimed in claim 21, wherein the means to mount pedals comprises a bottom bracket of the second rigid member.

23. A bicycle as claimed in claim 22, wherein the bicycle further comprises a rear wheel, a pedal-driven propulsion means mounted to the bottom bracket of the second rigid member and linked to said rear wheel, a front frame mounted rotatably to a head set tube portion of the first member, a steering means mounted to the front frame and a front wheel mounted to the front frame.

24. A bicycle as claimed in claim 23, wherein the front frame comprises the shock-absorbing means.

25. A bicycle frame as claimed in claim 16, wherein the shock absorbing means is so mounted to the frame elements as to be disposed in a gap therebetween.

26. A bicycle frame as claimed in claim 25, wherein the second rigid member passes between the frame elements without being connected directly thereto.

* * * * *